Patented Nov. 17, 1953

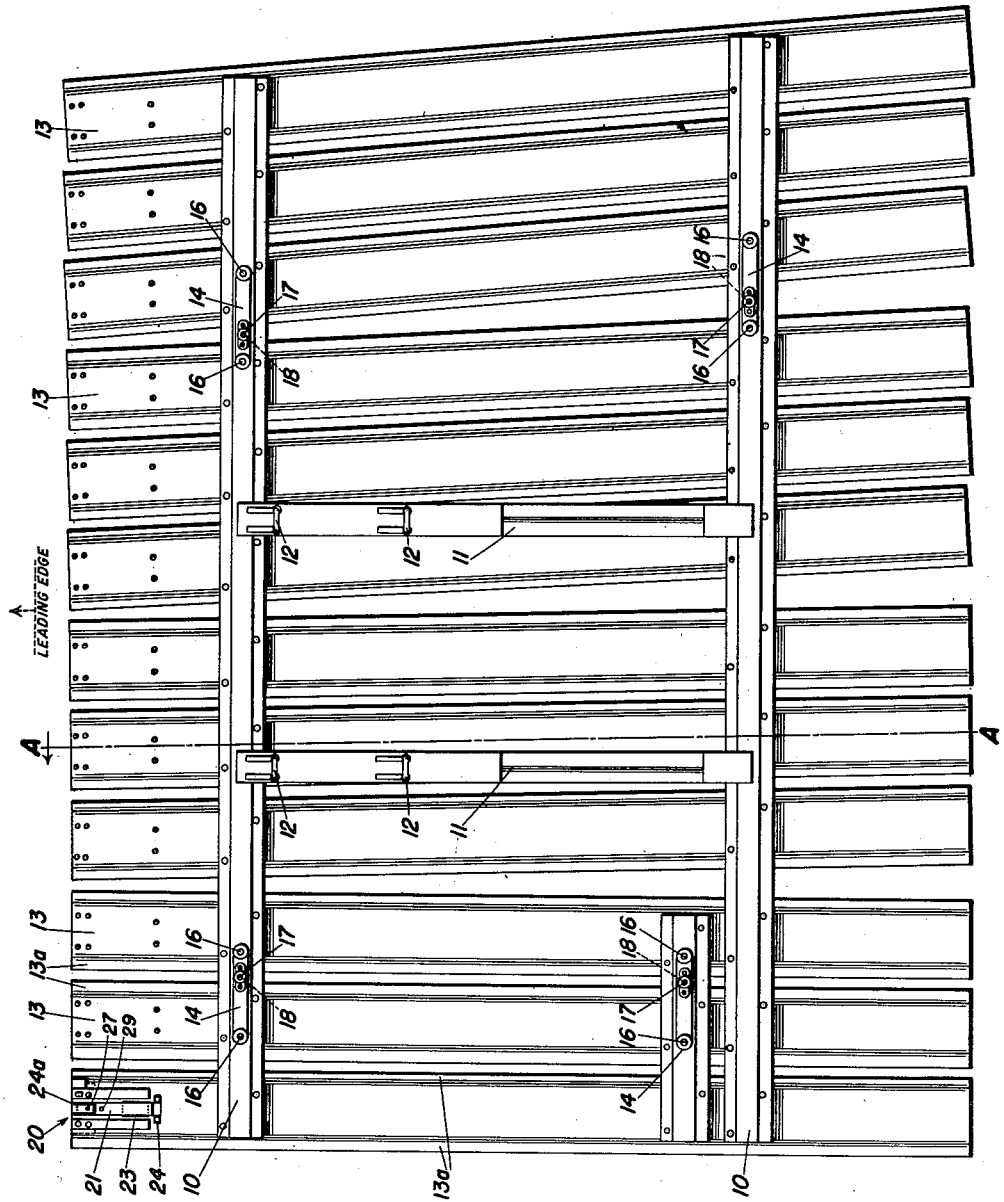

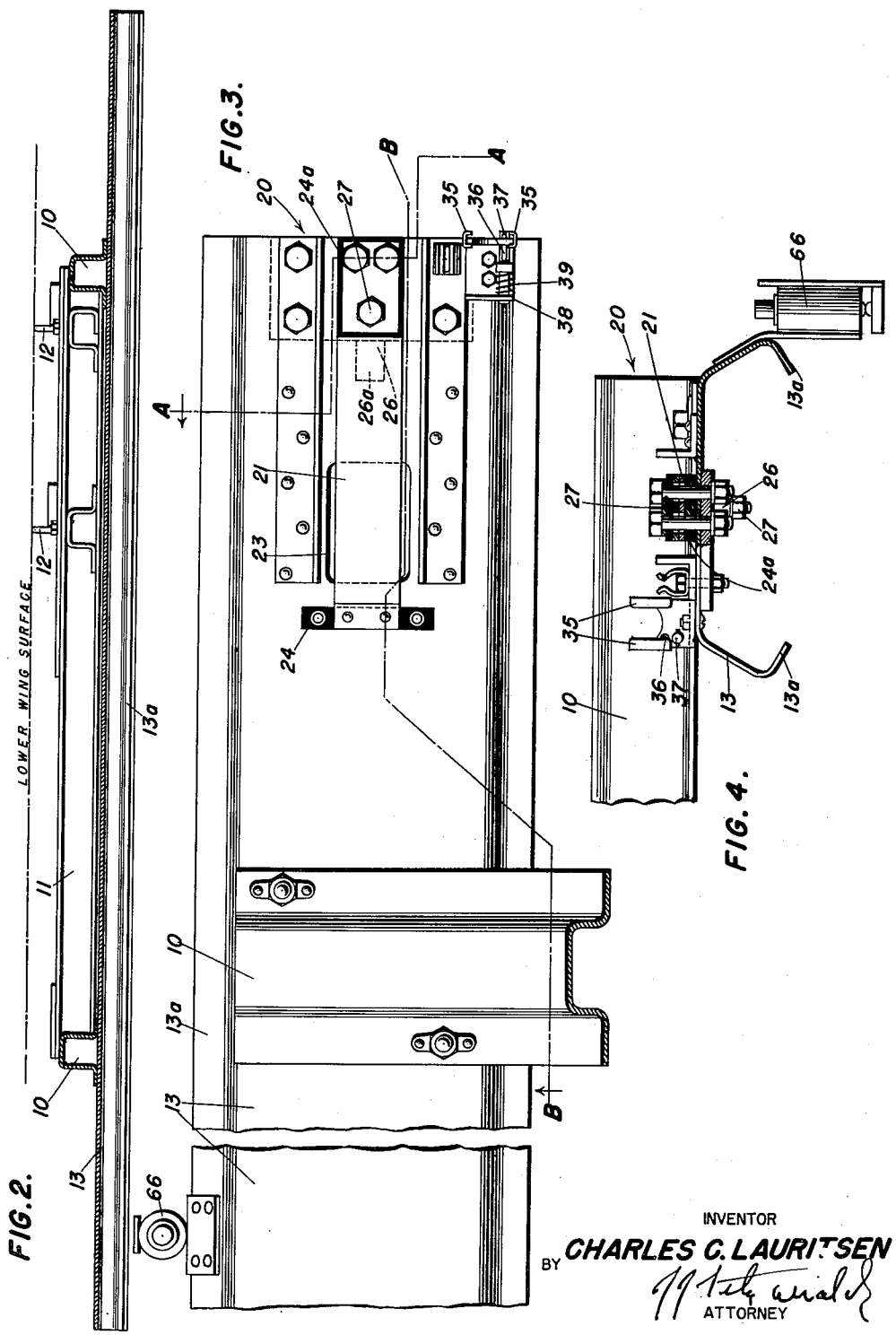

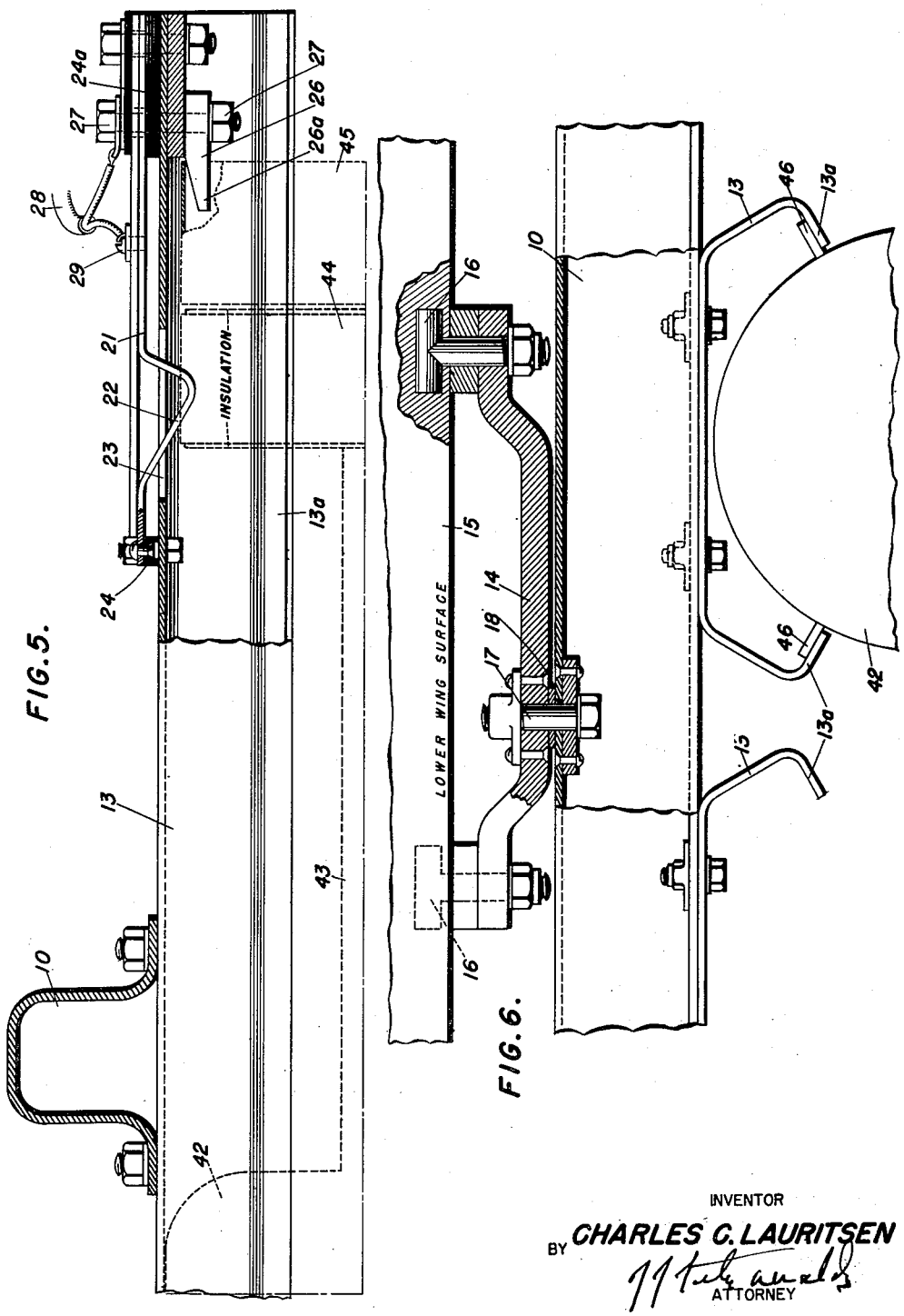

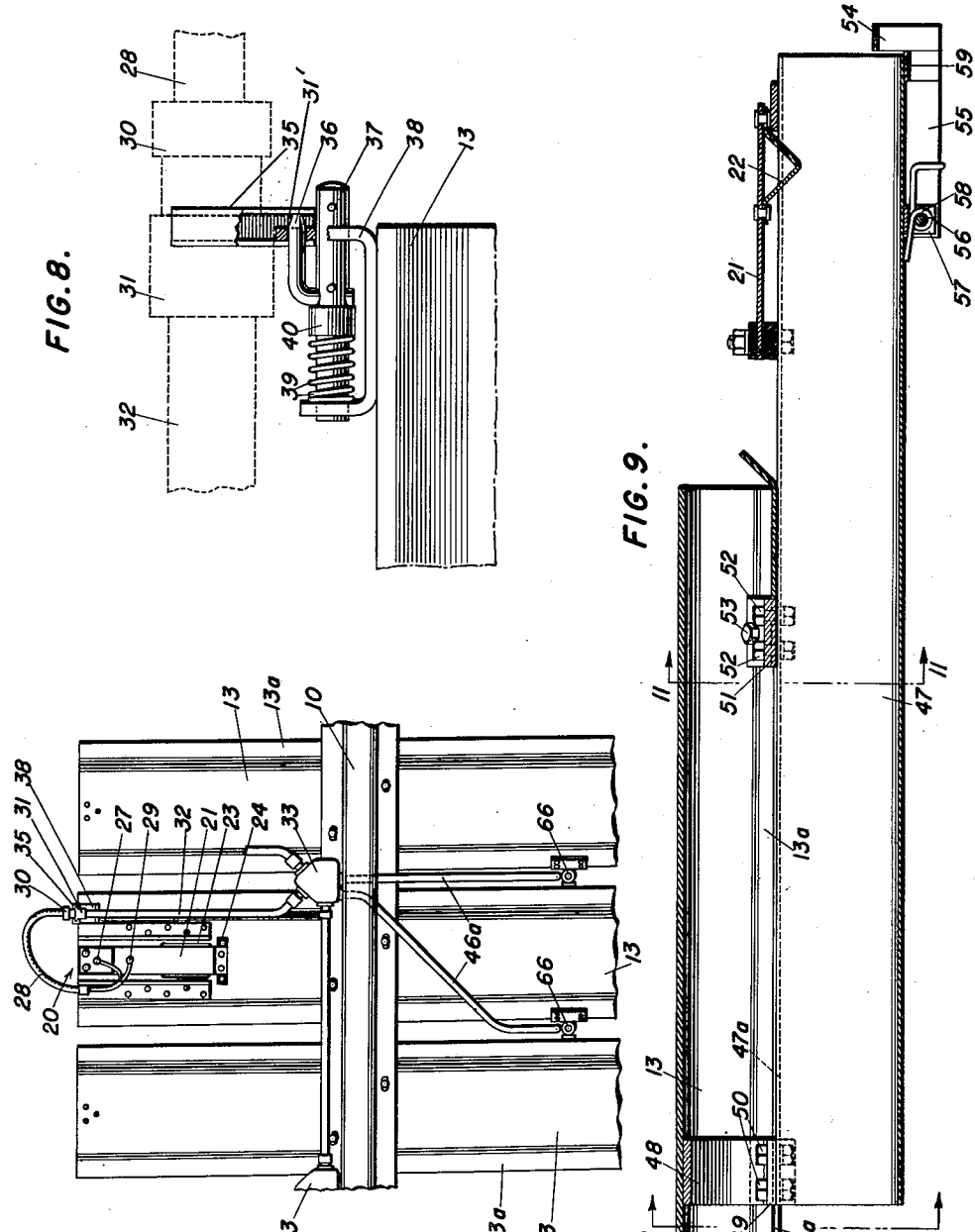

2,659,274

UNITED STATES PATENT OFFICE 2,659,274

ROCKET PROJECTOR WITH ADAPTER

Charles C. Lauritsen, Pasadena, Calif.

Application April 2, 1943, Serial No. 481,649

2 Claims. (Cl. 89—1.7)

This invention relates to projectors for rocket propelled devices and more particularly to a rocket projector of novel construction for use on aircraft. The new projector is adapted to be mounted on the lower surface of a wing on an airplane and includes means for electrically energizing the rocket devices to ignite the combustible propellant therein.

Rocket propelled devices have been made heretofore which comprise a rocket motor containing an electrical igniter for initiating combustion of the propellent charge in the motor, the igniter being energized through a tail ring assembly on the motor body. A motor of this type is disclosed in a copending application of C. C. Lauritsen, Ser. No. 481,645, filed April 2, 1943, now Patent No. 2,469,350. For some purposes, it is desirable to employ rocket motors of this type on airplanes, as, for example, to propel a bomb rearwardly from the airplane so as to compensate for its forward velocity and cause the bomb to strike a point substantially in line vertically with the point from which the bomb was released.

One object of the present invention, therefore, is to provide a novel rocket projector for airplanes, which comprises a support or guide for mounting the rocket assembly and directing it during its acceleration, and means on the guide engageable with the tail ring assembly of the motor body for energizing the igniter in the body.

Another object of the invention resides in the provision of a novel rocket projector for airplanes, in which the guide for the rocket assembly carries a removable adaptor for receiving a smaller rocket assembly, such as a sub-calibre bomb and rocket for practice bombing.

These and other objects of the invention may be better understood by reference to the accompanying drawings illustrating one form of the new projector suitable for use in the rearward projection of bombs from airplanes. In the drawings:

Fig. 1 is a plan view of one form of the new projector;

Fig. 2 is a sectional view of the line A—A in Fig. 1;

Fig. 3 is an enlarged plan view of part of the projector, showing the contact means for energizing the rocket igniter;

Figs. 4 and 5 are sectional views on the lines A—A and B—B, respectively, in Fig. 3;

Fig. 6 is a transverse sectional view of part of the projector, illustrating the manner of supporting the rocket device in the projector;

Fig. 7 is a plan view of part of the projector showing the electrical connections for the contact means;

Fig. 8 is an enlarged detail view of a releasable locking device for part of the electrical system, and Fig. 9 is a sectional view of the projector showing an adaptor mounted thereon for receiving a smaller rocket assembly.

Figure 10:
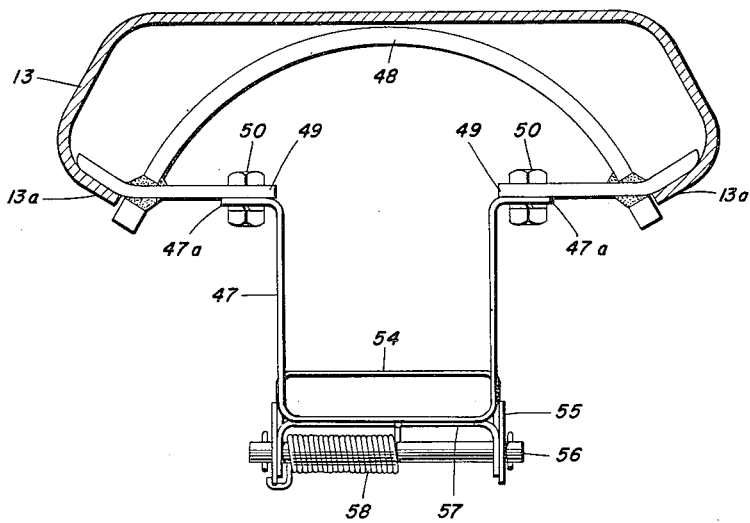
Figure 11:
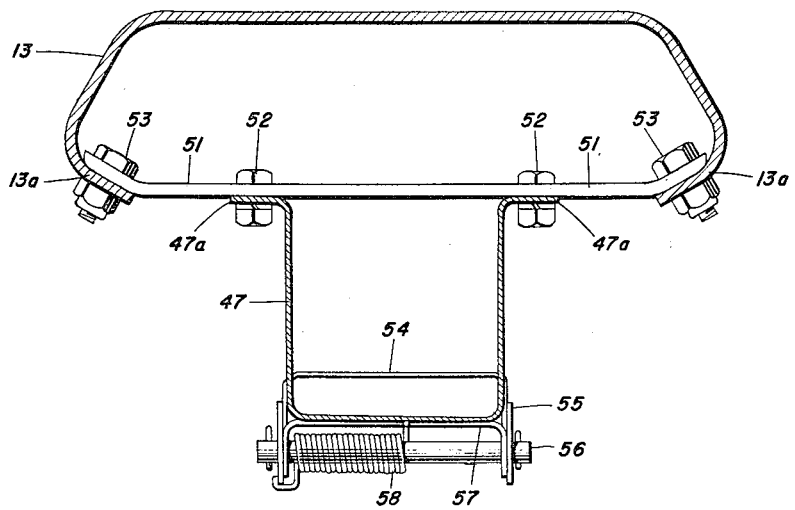

Figs. 10 and 11 are transverse sectional views of the projector and adaptor taken on the lines 10—10 and 11—11 respectively of Fig. 9.

The projector, as shown, comprises a pair of transverse beams 10 connected together intermediate their ends by longitudinal bars 11. The beams 10 and bars 11 constitute a frame which is adapted to be mounted on the lower wing surface of an airplane, preferably by means of inverted U-shaped members 12 secured to the bars 11 and connected to the usual bomb hooks (not shown) on the airplane. The frame may be provided with four connecting elements 12, two on each of the bars 11.

A plurality of inverted, trough-shaped members 13 are mounted on the beams 10 of the frame and extend lengthwise of the airplane in slightly diverging relation from the leading edge of the wing, as shown in Fig. 1. The members 13 form guides or rails for the rocket assemblies and have inwardly turned side edges 13a. Preferably, additional supporting means are provided for the frame 10—11 in the form of spaced bars 14 secured to the lower wing surface 15 (Fig. 6) by T-bolts 16 seated in the wing, the frame members 10 being connected to the bars 14 by bolts 17 extending through spaced openings 18 in the frame.

On the rear end portion of each guide or rail 13 is a contact assembly 20 comprising a spring arm 21 mounted between the upper surface of the rail and the lower surface of the airplane wing. Each spring 21 has a contact 22 extending downwardly through an opening 23 in the rail, the spring being suitably insulated from the rail, as by means of insulating blocks 24 and 24a. To the rear of the contact 22, each rail has a block 26 provided with a forwardly extending, beveled contact 26a. The block 26 is grounded to the rail and may be connected thereto in any suitable manner, as by means of a terminal bolt 27. As shown in Fig. 7, the contact assembly is energized through a 2-wire cable 28 having one wire connected to the grounded terminal 27, and the other wire connected to the insulated spring arm 21, as shown at 29. The other end of the cable 28 has a plug 30 which normally fits in a socket 31 connected through wiring 32 to one of a plurality of distributor boxes 33 mounted on the frame. The distributor boxes 33 are spaced along the front frame member 10 so that each box supplies two adjacent rails 13, the boxes being connected to a suitable current source (not shown).

In order to facilitate removal of the rails from the frame, I prefer to mount each of the sockets 31 in a retainer 35 secured to the rear end of the rail, the retainer having a locking detent 36 normally extending through an opening in the retainer and through an alined opening 31' in the socket 31. The detent 36 is mounted on a push rod 37 slidable in a frame 38 secured to the rail. The rod 37 and detent 36 are normally urged forwardly to maintain the detent in its locking position in the socket 31, and for this purpose I provide a compression spring 39 coiled around the push rod between the rear end of the frame and a collar 40 on the rod.

Any desired number of rails 13 may be mounted on the frame 10—11, but for illustrative purposes I have shown 12 rails. While a contact assembly 20 is shown on only one of the rails, it will be understood that each of the rails is provided with a similar contact assembly at its rear end portion, that is, near the leading edge of the wing. Each of the rails 13 is adapted to support a rocker assembly having a motor of the form disclosed in the above identified application of C. C. Lauritsen, Ser. No. 481,645, now Patent No. 2,469,350. More particularly, the rocket assembly comprises an anti-submarine bomb 42 connected to the front end of the rocket motor comprising the body 43, which has a tail assembly made up of an insulated ring 44 and a grounded ring 45 extending around the rear end portion of the body. As disclosed in the above-identified application, the propellent charge in the rocket body is ignitible by an electrically operable igniter which is energized through the rings 44 and 45. Each bomb 42 has a pair of laterally extending supporting lugs 46 which rest on the inwardly turned edges 13a of the rail. The lugs 46 may be mounted on the bomb by means of a band (not shown) extending around the bomb casing. The rocket assembly is mounted on the rail from the front end thereof, that is, from the end opposite the contact means 20, by moving the rocket assembly rearwardly, tail first, until the lugs 46 move into the rail and rest upon the rail edges 13a. The rocket assembly is moved rearwardly on the lugs 46 until the tail ring 45 engages and rides up the sloping surface of contact 26a. In this position of the rocket assembly, the insulated ring 44 engages spring contact 22 which yields to permit movement of the tail rings along the rail. It will be apparent that the grounded contact 26a limits rearward movement of the rocket assembly in the rail.

When the distributor boxes 33 are connected to the current source, the contacts 22 and 26a are energized through wiring 32, the plug and socket 30—31 and the two-wire cable 28. As a result, the propellent charge in rocket body 43 is ignited electrically through the insulated contact 22, insulated ring 44, the rocket igniter (not shown), grounded ring 45, and the grounded contact 26a. The rocket assembly is then propelled forwardly in guide 13, that is, to the rear of the airplane, whereby the tail rings 44 and 45 slide off the contacts 22 and 26a. The rail 13 guides the rocket assembly during its acceleration by the rocket motor, so that the flight of the assembly may be directed accurately. In order to permit arming of the usual fuze (not shown) in the nose of the bomb 42, I provide a solenoid 66 mounted on the rail 13 adjacent the nose of the bomb and adapted to be energized from distributor 33 through wiring 46a. The fuze solenoid 66 may be of any desired type, solenoids for arming purposes being well known in the art.

When it is desired to remove one of the rails 13 from the frame 10—11, as in mounting the projector on the airplane wing, the push rod 37 is actuated to release the socket 31 in retainer 35, and the plug and socket 30—31 are disconnected. Thus, the rail may be removed easily without interfering with the wiring connections.

In the event that it is desired to use the projector with a smaller rocket and bomb assembly, the adaptor illustrated in Fig. 9 may be employed. As there shown, the adaptor comprises a trough-shaped guide 47 mounted in each of the rails 13. Near the front end of each rail is an arc-shaped member 48 welded at its ends to cross-pieces 49. One end of each cross-piece 49 engages the adjacent edge 13a of the rail, while the other end of the cross-piece is bolted to an outwardly extending flange 47a on the adaptor, as shown at 50. Near the rear end of the rail is a transverse member 51 secured to the guide flanges 47a by bolts 52, the ends of the member 51 being bolted to the inwardly turned edges 13a of the rail, as shown at 53. The adaptor guide 47 is mounted in the rail 13 from the front end thereof, that is, from the trailing edge of the wing, by sliding the adaptor forwardly in the rail until the members 48 and 51 rest on the rail edges 13a, and then bolting member 51 to the rail by bolts 53 when the adaptor is in position.

At its rear end, each adaptor guide 47 has a stop 54 for locating the sub-caliber rocket assembly in the adaptor substantially in the same manner as in Fig. 5. The stop 54 is mounted on an arm 55 extending along the bottom of the adaptor and pivoted at its front end on a transverse pivot 56. The pivot 56 is mounted in a frame 57 which may be welded to the adaptor. A spring 58 is coiled around the pivot pin 56 and urges the arm 55 upwardly against the bottom of the adaptor, the upward movement of the arm being limited by a stop 59 thereon. In operation, the sub-caliber rocket assembly is inserted in the rear end portion of the adaptor 47 by depressing the stop 54 against the action of spring 58. When the rocket assembly is in position in the adaptor, the stop 54 is released and returns automatically to its normal locking position, where it prevents rearward movement of the rocket assembly. The sub-caliber rocket assembly may be similar to that disclosed in a copending application of C. C. Lauritsen, Ser. No. 481,645, now Patent No. 2,469,350, filed April 2, 1943, and is fired electrically through a cable leading from the rear end of the assembly to a plug (not shown) which may be inserted in the socket 31 in place of plug 30.

I claim:

1. A rocket projector for airplanes, which comprises a frame, releasable means for mounting the frame on the lower wing surface of an airplane, an inverted trough-shaped member connected to the frame and having inwardly turned side edges for suspending a rocket by spaced fins extending laterally and upwardly of its sides, a trough-shaped adaptor for receiving a smaller rocket, said adapter having out-turned marginal side flanges engaging said inturned side edges, and transverse supports affixed to said adapter flanges and resting on said inturned side edges for supporting said adapter subjacent said trough-shaped member.

2. In a holder for missiles and the like having spaced fins extending laterally upwardly of their sides, an inverted trough-shaped longitudinal member provided with downwardly extending sides terminating in inturned spaced flanges on which said fins may rest, an upright trough-shaped longitudinal member for supporting a missile, and means supporting said upright trough member with its longitudinal axis below and parallel to the longitudinal axis of said first member, said cross member comprising means slidably positioned on and carried by the inturned spaced flanges of said first member and connected to said upright trough member.

CHARLES C. LAURITSEN.

References Cited in the file of this patent

UNITED STATES PATENTS

| Number | Name | Date |
|---|---|---|
| 455,279 | Cunningham | June 30, 1891 |
| 499,790 | Meadowcroft | June 20, 1893 |
| 741,079 | Tasker | Oct. 13, 1903 |
| 785,644 | Unge | Mar. 21, 1905 |
| 969,011 | Vedder | Aug. 30, 1910 |
| 1,085,125 | Hoagland | Jan. 27, 1914 |
| 1,092,763 | Bourdelles | Apr. 7, 1914 |
| 1,108,716 | Davis | Aug. 25, 1914 |
| 1,215,255 | Davison | Feb. 6, 1917 |
| 1,434,044 | Cooke | Oct. 31, 1922 |
| 1,621,654 | Boos | Mar. 22, 1927 |
| 1,681,434 | Richardson | Aug. 21, 1928 |
| 2,029,778 | Krammer | Feb. 4, 1936 |
| 2,082,672 | Waugh | June 1, 1937 |
| 2,199,898 | Visser | May 7, 1940 |
| 2,324,901 | Bedard | July 20, 1943 |
| 2,325,560 | Wauters | July 27, 1943 |
| 2,377,431 | Lakso | June 5, 1945 |
| 2,469,350 | Lauritsen | May 10, 1949 |

FOREIGN PATENTS

| Number | Country | Date |
|---|---|---|
| 20,693 | Great Britain | of 1908 |
| 525,065 | Great Britain | Aug. 21, 1940 |
| 640,425 | Germany | Jan. 4, 1937 |
| 804,838 | France | Nov. 3, 1936 |
| 832,464 | France | July 4, 1938 |